(12) United States Patent
Wiggs

(10) Patent No.: US 10,443,909 B2
(45) Date of Patent: Oct. 15, 2019

(54) SUB-SURFACE INSULATION AND WELL DEPTH REDUCTION FOR DX GEOTHERMAL HEAT PUMP AND REFRIGERATION SYSTEM

(71) Applicant: EARTH TO AIR SYSTEMS, LLC, Franklin, TN (US)

(72) Inventor: B. Ryland Wiggs, Franklin, TN (US)

(\*) Notice: Subject to any disclaimer, the term of this patent is extended or adjusted under 35 U.S.C. 154(b) by 727 days.

(21) Appl. No.: 14/357,502

(22) PCT Filed: Nov. 15, 2012

(86) PCT No.: PCT/US2012/065379
§ 371 (c)(1),
(2) Date: May 9, 2014

(87) PCT Pub. No.: WO2013/074853
PCT Pub. Date: May 23, 2013

(65) Prior Publication Data
US 2014/0311174 A1  Oct. 23, 2014

Related U.S. Application Data

(60) Provisional application No. 61/560,018, filed on Nov. 15, 2011.

(51) Int. Cl.
*F25B 27/00* (2006.01)
*F25B 30/06* (2006.01)
(Continued)

(52) U.S. Cl.
CPC .............. *F25B 27/00* (2013.01); *F24T 10/15* (2018.05); *F25B 30/06* (2013.01); *F25B 13/00* (2013.01);
(Continued)

(58) Field of Classification Search
CPC .......... F24T 10/15; F25B 13/00; Y02E 10/12; Y02E 10/125
See application file for complete search history.

(56) References Cited

U.S. PATENT DOCUMENTS 5,272,879 A   12/1993  Wiggs
5,419,135 A   5/1995   Wiggs
(Continued)

FOREIGN PATENT DOCUMENTS

CA   2710219 A1   1/2011
EP   1975498 A1   10/2008
(Continued)

OTHER PUBLICATIONS

International Search Report for PCT/EP2012/065379, report dated Feb. 1, 2013.

*Primary Examiner* — Orlando E Aviles

(57) ABSTRACT

At least one of a DX geothermal refrigeration system design, a reverse-cycle DX geothermal heat pump system design, a DX geothermal cooling mode only system design, and a DX geothermal heating mode only system design, which utilize the sub-surface geology with a grouted well as a heat sink in the cooling/refrigeration mode, and as a heat source in the heating mode; with an optional air-source high level heat sink for use in the refrigeration mode; with optional multiple sub-surface larger sized vapor refrigerant lines, as well as with a super-efficient vacuum insulation design for relevant sub-surface refrigerant transport tubing, and with an optional specially designed electronic expansion valve.

7 Claims, 6 Drawing Sheets

(51) Int. Cl.
  *F24T 10/15* (2018.01)
  *F25B 13/00* (2006.01)
  *F25B 43/02* (2006.01)

(52) U.S. Cl.
  CPC ........... *F25B 43/02* (2013.01); *F28F 2270/00* (2013.01); *Y02E 10/125* (2013.01)

(56) References Cited

U.S. PATENT DOCUMENTS

| | | | |
|---|---|---|---|
| 5,561,985 A * | 10/1996 | Cochran | F25B 30/06 62/260 |
| 5,623,986 A | 4/1997 | Wiggs | |
| 5,671,608 A | 9/1997 | Wiggs et al. | |
| 5,816,314 A | 10/1998 | Wiggs et al. | |
| 5,931,879 A | 8/1999 | Neumann et al. | |
| 5,946,928 A | 9/1999 | Wiggs | |
| 6,615,601 B1 | 9/2003 | Wiggs | |
| 6,751,974 B1 | 6/2004 | Wiggs | |
| 6,789,608 B1 | 9/2004 | Wiggs | |
| 6,932,149 B2 | 8/2005 | Wiggs | |
| 6,971,248 B1 | 12/2005 | Wiggs | |
| 7,080,524 B2 | 7/2006 | Wiggs | |
| 7,146,823 B1 | 12/2006 | Wiggs | |
| 7,191,604 B1 | 3/2007 | Wiggs | |
| 7,234,314 B1 | 6/2007 | Wiggs | |
| 7,401,641 B1 | 7/2008 | Wiggs | |
| 7,578,140 B1 | 8/2009 | Wiggs | |
| 7,591,145 B1 | 9/2009 | Wiggs | |
| 7,832,220 B1 | 11/2010 | Wiggs | |
| 7,841,200 B1 | 11/2010 | Wiggs | |
| 7,841,383 B2 | 11/2010 | Wiggs | |
| 7,856,839 B2 | 12/2010 | Wiggs | |
| 7,886,558 B2 | 2/2011 | Wiggs | |
| 7,938,904 B1 | 5/2011 | Wiggs | |
| 8,033,127 B2 | 10/2011 | Wiggs | |
| 8,082,751 B2 | 12/2011 | Wiggs | |
| 2004/0129408 A1 | 7/2004 | Wiggs | |
| 2004/0206103 A1 | 10/2004 | Wiggs | |
| 2006/0086121 A1 | 4/2006 | Wiggs | |
| 2007/0151280 A1 | 7/2007 | Wiggs | |
| 2008/0016894 A1 | 1/2008 | Wiggs | |
| 2008/0173425 A1 | 7/2008 | Wiggs | |
| 2009/0065173 A1 | 3/2009 | Wiggs | |
| 2009/0095442 A1 | 4/2009 | Wiggs | |
| 2009/0120606 A1 | 5/2009 | Wiggs | |
| 2009/0260378 A1 | 10/2009 | Wiggs | |
| 2009/0272137 A1 | 11/2009 | Wiggs | |
| 2010/0011793 A1 | 1/2010 | Tiranno et al. | |
| 2011/0100588 A1 | 5/2011 | Wiggs | |
| 2011/0209848 A1 | 9/2011 | Wiggs | |

FOREIGN PATENT DOCUMENTS

| | | |
|---|---|---|
| JP | 2009276029 A | 11/2009 |
| JP | 201032015 A | 2/2010 |

\* cited by examiner

SUB-SURFACE INSULATION AND WELL DEPTH REDUCTION FOR DX GEOTHERMAL HEAT PUMP AND REFRIGERATION SYSTEM

FIELD OF THE DISCLOSURE

The present disclosure relates to insulation for sub-surface working fluid lines utilized in both direct exchange (DX) geothermal heat pump systems and in DX geothermal refrigerant systems. DX geothermal heat pump systems (which typically operate, in a reverse-cycle heating and cooling mode) are also commonly referred to as DX heating/cooling systems.

BACKGROUND OF THE DISCLOSURE

Geothermal ground source/water source heat exchange systems typically use fluid-filled closed loops of line buried in the ground, or submerged in a body of water, to either absorb heat from, or to reject heat into, the naturally occurring geothermal mass and/or water surrounding the buried or submerged fluid line. The line loop is extended to the surface and is then used to circulate naturally warmed or cooled fluid to an interior air heat exchange means.

Common and older design geothermal water-source heating/cooling systems typically circulate, via a water pump, a fluid comprised of water, or water with antifreeze, circulated within plastic (typically polyethylene) underground geothermal lines to transfer geothermal heat to or from the ground in a first heat exchange step. Via a second heat exchange step, a refrigerant working fluid heat pump system is utilized to transfer heat to or from the water. Finally, via a third heat exchange step, an interior air handler (comprised of finned line and a fan), or optionally a refrigerant to water heat exchanger, is utilized to transfer heat to or from the refrigerant to heat or cool interior air space.

Newer design geothermal DX heat exchange systems, where the refrigerant fluid lines are placed directly in the sub-surface ground and/or water, typically circulate a refrigerant fluid, such as R-22, R-407C, R-410A, CO2 (R-744), or the like, in sub-surface refrigerant lines, typically comprised of metal (such as copper) lines, to transfer geothermal heat to or from the sub-surface geology via a first heat exchange step. Unlike water-source designs, DX systems only require a second heat exchange step to transfer heat to or from the interior air space, or optionally to interior water, typically by means of an interior air handler or an optional refrigerant to water heat exchanger (all of which are well understood by those skilled in the art). Consequently, DX systems are generally more efficient than water-source systems because less heat exchange steps are required and because no water pump energy expenditure is necessary to circulate the working fluid within sub-surface geology. Further, since metal is a better heat conductor than most plastics, and since the refrigerant fluid circulating within the metal line of a DX system generally has a greater temperature differential with the surrounding sub-surface geology than the water circulating within the plastic line of a water-source system, generally, less excavation and drilling is required, and, consequently, installation costs are typically lower with a DX system than with a water-source system, thereby decreasing payback periods and enhancing economic viability.

While most in-ground/in-water DX heat exchange designs are feasible, various improvements have been developed intended to enhance overall system operational efficiencies. Several such design improvements, particularly in direct expansion/direct exchange geothermal heat pump systems, are taught, for examples, in U.S. Pat. No. 5,623,986 to Wiggs; in U.S. Pat. No. 5,816,314 to Wiggs, et al.; in U.S. Pat. No. 5,946,928 to Wiggs; in U.S. Pat. No. 6,615,601 B1 to Wiggs; and in U.S. Pat. No. 6,932,149 to Wiggs, the disclosures of which are incorporated herein by reference. Such disclosures encompass both horizontally and vertically oriented sub-surface heat geothermal heat exchange means.

While DX systems are generally more efficient than water-source geothermal system designs, DX systems are also generally more efficient than air-source heat pump system designs for several reasons.

One reason is because a DX system does not require a "defrost cycle" while operating in the heating mode. A defrost cycle essentially reverses the air-source heat pump system's reversing valve to direct hot refrigerant gas exiting the compressor into the outdoor heat exchange line (typically finned refrigerant line) to melt any frozen moisture that has accumulated on the exterior refrigerant to air heat exchange lines, to provide full, and/or close to full, airflow and heat exchange across the exterior lines. Unfortunately, when operating in a defrost cycle, valuable warm interior air is utilized to warm and vaporize the system's refrigerant, which warmed refrigerant vapor is then compressed by the system's compressor to materially raise both the pressure and the temperature of the refrigerant. This now hot refrigerant gas is sent outside to melt frozen moisture on the exterior heat exchange line. Therefore, valuable interior heat (in the winter and/or in the heating mode) is typically withdrawn from the interior of a structure and is rejected into the exterior air when the air-source heat pump is operating in a defrost cycle. The resulting loss of interior heat usually must be made up via supplemental or back-up heat, usually comprised of electric resistance heat and/or the burning of a fossil fuel, all of which is very costly and inefficient.

Another reason DX systems are also generally more efficient than air-source heat pump system designs (as well as refrigeration system designs using air as their heat sink) is because, in the cooling mode, waste heat from the refrigerant is being rejected into a relatively cool (often about 50-60 degrees F.) sub-surface environment, as opposed into relatively hot (often about 80-100 degrees F.), exterior air (as would be the case with an air-source heat pump). The typically cooler heat sink for a DX system both keeps refrigerant pressures lower (which directly translates into lower compressor power draws and lower system operational costs) and keeps refrigerant temperatures cooler (which assists in removing more humidity from interior air), with both aspects being advantageous.

Also, a DX system is generally more efficient than an air-source heat pump because no exterior fan is required in a DX system. The total elimination of an exterior fan (designed to blow exterior air over the refrigerant to air heat exchange line of an air-source system) can result in an overall 10-20% system power reduction.

However, while DX systems are more efficient than other various heat pump technology designs, as explained above, a DX system requires a sub-surface heat exchange loop for operation. While such a loop can be placed in water, if an adequate water source/supply is available, most often, DX systems need to be installed with their sub-surface heat exchange loops inserted into drilled wells/boreholes. In such wells/boreholes, the DX heat exchange loops always consist of a hot/warmer vapor phase working fluid (typically a refrigerant) line and a cold/cooler liquid phase working fluid line, which respective vapor line and liquid line are operably coupled together at, or near, the bottom of the well/borehole. Being in close proximity to one another, a concern in any DX system is the potential for "short-circuiting" the advantageous geothermal heat transfer within the well itself, as opposed to primarily and far more advantageously within the interior heat exchanger, because heat naturally flows to cold via Fourier's Law.

Thus, in the heating mode, exiting refrigerant from the well, which has absorbed valuable geothermal heat within the well, loses some portion of the geothermal heat gain to the entering colder liquid fluid line in close proximity within the well, all before the maximum geothermal heat gain possible can be delivered to the compressor for heat accentuation and use, as is all well understood by those skilled in the art. Typically, temperatures might be as low as about 15° F., or colder, within the coldest working fluid within the well, and might exit the well at only around 30° F., or colder, after acquiring geothermal heat. The only protection against such geothermal heat loss from the warmer exiting line to the colder entering line within the well itself is by insulating the cooler liquid line. Currently, such insulation (which is not used at all in water-source systems) in DX system designs is comprised of one of a mostly solid plastic insulation and a mostly expanded foam type rubber or plastic insulation, which insulation surrounds certain portions of the liquid phase line within the well, to help protect against heat transfer from the hot/warmer vapor phase refrigerant transport exiting line to the entering colder at least partially liquid phase refrigerant transport line within the well itself.

In the cooling mode of operation, the "short-circuiting" heat transfer issue/concern within the well is magnified, because of the extremely hot temperatures (typically 140-180° F.) of the vapor line entering the well (with the well and surrounding geology being used as a heat sink) being in close proximity to the return cooler liquid phase refrigerant exiting the well with the exiting refrigerant temperature typically being in the approximately 65-90° F. range. Again, as in the heating mode (the heating mode has a reverse-cycle refrigerant directional flow within the well from that of the cooling mode), the only protection against the "short-circuiting" effect of heat entering the well (via the hot vapor phase refrigerant) being transferred into the exiting geothermal cooled liquid phase refrigerant is the insulation surrounding some portion of the cooler liquid phase line. A normal sub-surface ground temperature range is typically approximately 50-60° F. within about 500 feet of the surface. Thus, if one is able to avoid most of the "short-circuiting" effect between the cooler liquid phase refrigerant line and the warmer vapor phase refrigerant line within the well/borehole itself, overall system operational efficiencies will be increased.

SUMMARY OF THE DISCLOSURE

For a refrigeration system operating exclusively in the low temperature range cooling mode (with low temperature cooling range that is near, or below, freezing), using the ground, instead of air, as a heat sink may be extremely advantageous, particularly in the area of cryogenic cooling. In such a situation, the avoidance of such an explained "short-circuiting" of heat transfer within the well itself would also be an extreme advantage, as this would help to avoid the currently necessary multiple heat exchange steps and/or the use of far more complex equipment, which relies upon outdoor air temperatures as a heat sink.

For example, common refrigeration designs are currently modeled around air-cooled heat sinks, with outdoor air temperatures necessarily calculated at about 100° F., or greater, levels. Thus, a means of providing a consistent geothermal heat sink, with even a maximum heat sink at or below approximately 90° F. would be a significant efficiency advantage. In order to provide such a geothermal heat sink for a refrigeration system, the refrigeration system may need to include a highly efficient oil separator (at least about 98% efficient) or an additive that prevents compressor lubricating oil from adhering to the interior walls of the sub-surface refrigerant line, as well as with the herein described super-efficient sub-surface liquid line insulation means.

Further, regarding a conventional DX reverse-cycle system design, testing has indicated that by utilizing the super-efficient sub-surface liquid line insulation means disclosed herein, the need for a relatively larger than normal accumulator may be eliminated, and the sub-surface ground loop design depth may be decreased by at least about 10% or more (which decreases installation costs and payback periods, making such a system more economically viable).

Heretofore, refrigeration systems have solely used air or water as a heat sink. Consequently, the incorporation of one or more of the DX system improvement disclosures taught herein would also be extremely advantageous in a conventional refrigeration system.

While conventional DX geothermal heat pump systems are generally known, heretofore, DX system technologies are not known to have been used in the refrigeration field. In the refrigeration field, compressors, heat exchangers, and refrigerant working fluids are utilized just as in the conventional DX geothermal system field. However, while conventional DX heat pump systems are typically reverse-cycle designs, in the refrigeration field only the cooling mode of operation is utilized. Also, in the refrigeration field, unlike conventional DX geothermal system designs, the use of relatively low-pressure refrigerants are often incorporated. Refrigeration systems typically, with a few exceptions operating on CO2 (R-744), or the like, require the use of refrigerants such as R-134A and/or R-404A, or the like, as opposed to refrigerants such as R-22, R-407C and/or R-410A commonly used in the standard geothermal DX and air-source heat pump industry. However, a CO2 (R-744) refrigerant, or the like, may optionally be utilized across the board in DX and air-source heat pump systems, as well as in refrigeration systems. However, regardless of the refrigerant utilized, and regardless of whether a conventional DX heat pump system or a DX refrigeration system, both of which would incorporate at least one heat transfer step within sub-surface geology, the designs disclosed herein will constitute significant operational efficiency advantages, as well as contribute to lower initial system costs.

Also, conventional DX geothermal systems typically require about 100-120 feet per ton of exposed refrigerant heat exchange tubing in a sub-surface geology, with tonnage based on the maximum system design load capacity in tons, where 1 ton equals 12,000 BTUs. The ability to reduce such related drilling and grouting requirements necessary to accommodate such ratios would be extremely advantageous.

Lastly, no known DX system utilizes electronic expansion devices to control refrigerant operating parameters, such as superheat and temperature/pressure. While electronic expansion devices are generally known for conventional refrigeration and various heat pump system designs, the best operational design parameters for the use of an electronic expansion device in a DX refrigeration system or a DX geothermal heat pump system has never before been known to have been determined and/or disclosed. The disclosure of such design parameters under sub-surface geology temperature conditions, in conjunction with operational refrigerant pressures necessary to circulate refrigerants in and out of wells/boreholes, would also be advantageous.

A super-efficient insulation means for the cooler liquid line in a DX system application, for a reverse-cycle DX heat pump system, a heating mode only DX heat pump system, or both a DX refrigeration system and a DX heat pump system that solely operate in the cooling mode, is disclosed herein. Reverse-cycle DX heat pump systems typically operate on one of an R-22, R-407C, R-410A, CO2 (R-744), or the like, while a refrigeration system typically operates on a lower pressure refrigerant, such as R-134A, R-404A, or the like, although sometimes refrigeration systems can be designed to operate on higher pressure refrigerants such as R-410A or R-744, or the like. The present disclosure provides a solution by enhancing both heat pump and refrigeration system operational efficiencies, reducing system installation costs, and optimizing geothermal heat transfer advantages, by providing:

- a means to reduce well depths and well, well casing, and/or well grouting costs for a DX geothermal heat pump system and/or a DX geothermal refrigeration system, thereby improving the economic viability of such system designs;
- a significantly more efficient insulation means, comprised of a super-efficient sub-surface working fluid line insulation design, for the sub-surface portions of insulated working fluid (typically a refrigerant) line in a DX geothermal refrigeration system and/or in a DX geothermal heat pump system; and
- electronic expansion valve design parameters that will operate in at least one of the heating and cooling/refrigeration modes for a DX heat pump system and/or refrigeration system.

BRIEF DESCRIPTION OF THE DRAWINGS

For a more complete understanding of this disclosure, reference should be made to the embodiments illustrated in greater detail on the accompanying drawings, wherein.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that the disclosures herein are not limited to the particular embodiments illustrated herein, and that various changes may be made and/or equivalents may be substituted for elements thereof without departing from the scope of the disclosures herein. In addition, modifications may be made to adopt a particular situation or material to the teachings of the disclosures without departing from the essential scope thereof. It is intended that the disclosures herein not be limited to the particular embodiments disclosed herein as necessarily being the best mode contemplated for carrying out the disclosures, but that the disclosures herein will include all embodiments falling within the scope of the claims herein.

DETAILED DESCRIPTION

The following detailed description is not intended in a limiting sense, and is made solely for the purpose of illustrating the general principles of the invention. The various features and advantages of the present disclosure may be more readily understood with reference to the following detailed description taken in conjunction with the accompanying drawings.

Figure 1:
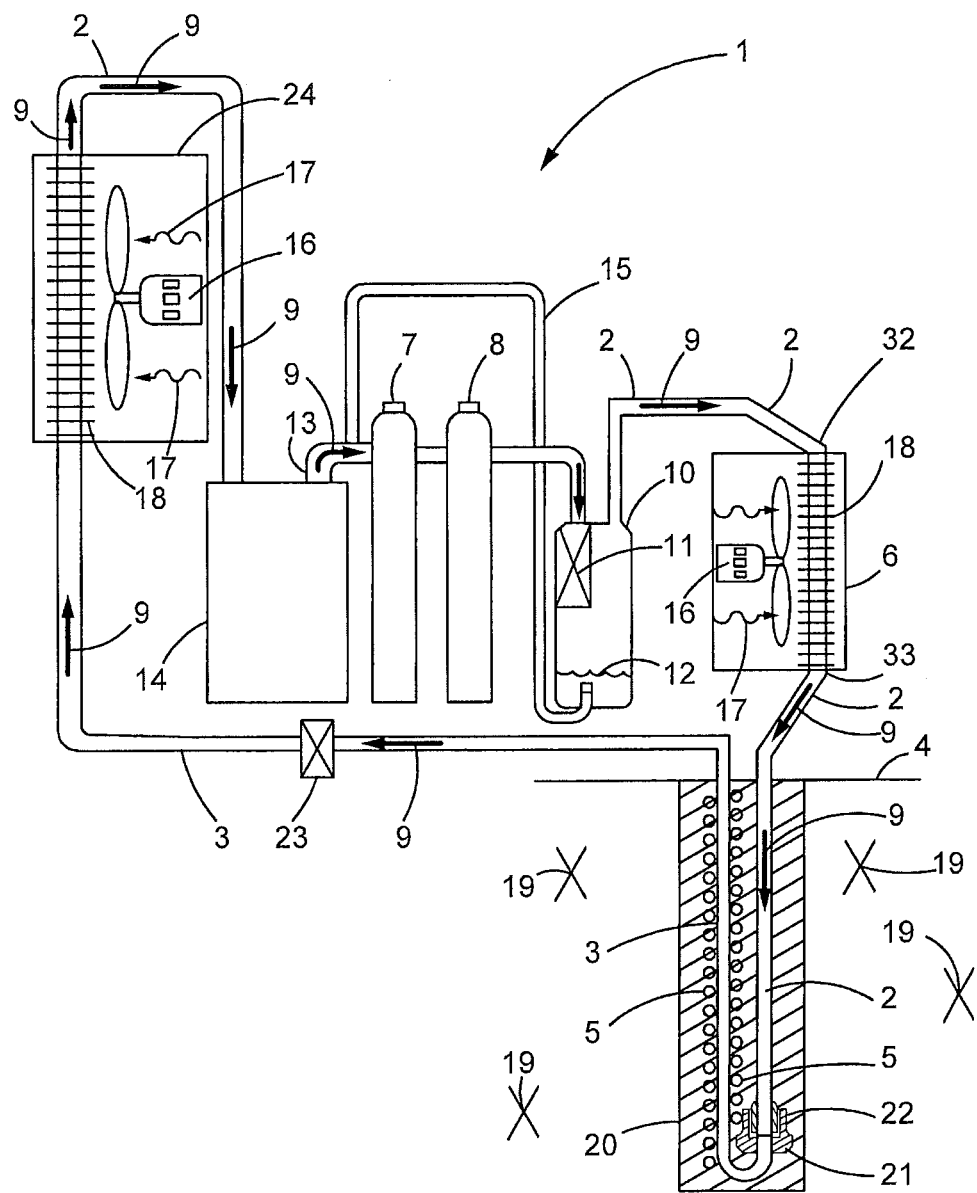
FIG. 1 is a schematic side view of a refrigeration DX system design, as well as a DX heat pump system via only a few described modifications, utilizing the sub-surface geology as a heat sink in the cooling/refrigeration modes and as a heat source in a DX system heating mode, with the sub-surface refrigerant transport loop comprised of a larger vapor refrigerant line and a smaller (super-insulated) liquid refrigerant line within a grouted well/borehole, with an optional High Level Heat Dissipating Unit to dispose of relatively high temperature waste heat into the air, before the hot refrigerant enters the well, when operating in the cooling and refrigeration mode, and with a special electronic expansion device that operates in at least one of the cooling/refrigeration modes and the heating mode.

Referring now to the drawings, FIG. 1 shows a schematic side view of a refrigeration DX system 1 (shown herein as operating in the cooling mode) having at least one larger vapor refrigerant transport line 2 and having at least one smaller liquid refrigerant transport line 3 (together comprising what is herein defined as a "ground loop"), situated below a surface 4 of ground and/or water and within the surrounding geology 19, thereby utilizing the geology 19 below the surface 4 as a sub-surface heat sink (in a refrigeration and/or cooling mode of operation). Although the DX system 1 is not also depicted herein in a heating configuration, in a DX heat pump system heating mode of operation, the sub-surface geology 19 would be used as the primary heat source. In the refrigeration mode of operation, air 17 is also optionally used as a heat sink, via an optional High Level Heat Dissipating ("HLHD") Unit 6, for relatively high level heat within the circulating refrigerant 9 exiting the system's 1 optional two compressors, 7 and 8, before the hot refrigerant 9 enters the ground loop.

Although in some refrigeration systems only one, or a first compressor 7, is utilized, various very low temperature refrigeration systems may use two cascading compressors (a first compressor 7 and a second compressor 8), as is well understood by those skilled in the art.

Also, although not shown herein, in some refrigeration systems, two or more separate closed loop refrigerant systems, utilizing refrigerant to refrigerant (or other working fluid, such as water/antifreeze) heat exchangers, may be utilized. In such event, a ground loop as shown herein would be optionally utilized for at least one of the respective closed loop refrigerant systems, and a ground loop would always be utilized in the last of several systems so as to maximize the cooling effect for the refrigerant (actual refrigerant is not shown in the drawings, but a refrigerant flow direction is indicated by straight arrows 9). No known conventional refrigeration system designs utilize a ground loop within a well 20 for the final exterior heat exchange step.

The refrigeration system 1 would typically use at least one working fluid comprised of a refrigerant. Starting from the first compressor 7, the refrigerant travels to the second compressor 8, and then into an oil separator 10 that has a filter 11 that may be at least about 98% efficient. As an example, the oil separator 10 shown herein has a filter 11 that filters most of the oil 12 (shown as an oil level 12 near the bottom of the oil separator 10) out of the refrigerant. The oil 12 is returned through an oil transport/return line 15 by means of the suction created by at least one compressor 7 and 8, along with the primary working fluid refrigerant within a suction line portion 13 to at least one compressor, 7 and 8, which suction line portion 13, is shown herein as an example positioned between the accumulator 14 and the first compressor 7. Most of the oil 12 separated from the refrigerant drops to the bottom of the oil separator 10, where the oil 12 is suctioned, by at least one of the compressors, 7 and 8, out of the oil separator 10, through the oil return line 15, back into the compressors, 7 and 8, themselves to provide necessary lubrication.

In order to utilize a vertically oriented sub-surface geothermal heat exchange loop, which loop is comprised of the larger vapor phase refrigerant transport line 2 and a smaller liquid line 3 surrounding by a super-insulation 5, testing has demonstrated the advantage of using at least one of an oil separator 10, as described above, and a special additive that acts to coat the interior surface area of both the sub-surface vapor line 2 and the liquid line 3, to help prevent any oil 12 from adhering to the interior walls of the respective lines. Such a special additive may be circulated and carried and deployed throughout the entire refrigerant transport lines of the system, in conjunction with the circulating refrigerant.

Once the refrigerant exits the oil separator 10, it next travels through an optional High Level Heat Dissipating ("HLHD") unit 6, where heat is removed by a fan 16 blowing air (indicated by arrows 17) over the hot/warm refrigerant within the larger vapor transport line 2. The HLHD unit 6 is positioned along the vapor line 2 prior to the vapor line traveling below the surface 4.

After excess heat is discharged into the air 18 by the HLHD unit 6, the refrigerant exiting the HLHD unit 6 (which refrigerant may be in the vapor or liquid phase) next enters and travels into the ground loop portion. If the refrigerant was changed to liquid within the HLHD unit 6, the refrigerant's velocity would slow down within the vapor line 2 segment of the sub-surface 4 ground loop, which will advantageously enhance sub-cooling abilities. If the refrigerant is still in the vapor phase after traveling through the HLHD unit 6, the refrigerant will be changed into a cooled liquid within the vapor line 2 segment of the sub-surface 4 ground loop. As the refrigerant may not be phased changed within the HLHD unit 6, the HLHD unit 6 may employ an inlet line 32 and exit line 33 that have the same larger size as the vapor line 2, and that the interior volume of any distributed heat transfer lines (distributed heat transfer lines are not shown herein as same are well understood by those skilled in the art) within the HLHD unit 6 have the same total combined interior cross-sectional area as both respective inlet and outlet lines 32, 33. Distributed heat transfer lines 34 within a refrigerant-to-air heat exchanger, such as the HLHD unit 6 described herein may consist of at least one of finned tubing 18 (only one finned tube 18 is shown herein as an example, although there are typically multiple distributed finned tubes) and of micro-channel tubing (not shown herein, as micro-channel tubing is also well understood by those skilled in the art). However, unlike the HLHD unit 6 described herein, distributed heat transfer lines within a refrigerant-to-air heat exchanger typically exit conventional such heat exchangers via smaller capillary liquid phase refrigerant transport lines (not shown herein as same are well understood by those skilled in the art), that are combined into a single smaller sized liquid refrigerant transport line 3 (as opposed to maintaining the same larger sized refrigerant transport line 2 exiting 33 the heat exchanger as that of the vapor refrigerant transport line 2 entering 32 the heat exchanger, as shown herein, although not necessarily to scale, via the same sized larger vapor refrigerant transport line 2 entering 32 and exiting 33 line of the HLHD unit 6).

Thus, by using the cooler temperature levels below the surface 4, the refrigerant working fluid for the refrigeration system 1 may be advantageously cooled to a much lower temperature than otherwise possible via only conventional air-source/outdoor air-cooled units in the summer, when out-door air temperatures are above the temperature of the sub-surface 4 geology 19.

Further, even in the winter, when outdoor air temperatures are below that of the geology 19 below the surface 4, the warmer geology temperatures maintain system operation at a somewhat steady heat transfer rate, without the finned 18 lines of the HLHD unit 6 becoming iced (via the freezing of natural moisture/humidity in the winter air 17) and impairing the outdoor refrigerant to air HLHD unit's 6 heat exchange ability. In fact, in a conventional exterior refrigeration air-cooled unit only, both winter defrosting issues and summer heat exchange issues are very challenging and can materially lower desired operational efficiencies. The refrigeration DX system 1 eliminates these operational inefficiencies and challenges associated with conventional designs.

After changing from a vapor state into a liquid state within the transport lines 2 and 3, the refrigerant within the larger sized (un-insulated) refrigerant line 2 located near the bottom of the well/casing 20, flows into the liquid refrigerant line 3 through a line coupling 21. The liquid phase refrigerant next flows up and out of the well/casing 20 through the sub-surface portion of the super-insulated 5 liquid refrigerant transport line 3.

The liquid refrigerant transport line 3 may have an insulation layer 5 extending around the sub-surface portion of the line 3, within the well 20 to avoid the short-circuiting problem noted above. The liquid refrigerant line 3 is shown herein as simply having an insulation layer 5 as a general example. However, to achieve the desirable maximum possible operational efficiencies, detailed and extensive testing has demonstrated that the liquid line 3 should be surrounded with a super-efficient insulating means. Such a super-efficient (meaning at least about one hundred percent more efficient than conventional HVAC insulation materials, such as expanded plastic or rubber foam, or solid or bubbled polyethylene, or the like) insulation 5 is achieved by the provision of a vacuum insulation (illustrated as empty annular space 26 in FIGS. 2-4 and 7-8). In this FIG. 1, the generic term insulation can mean at least one of regular insulation and/or a preferable super-efficient vacuum insulation means 26.

Here, the remaining empty space within the well 20 is shown as being filled with a highly heat conductive grout/fill material 22, which is preferably a cementitious Grout 111, or the like, to provide a good heat transfer (from the otherwise potentially empty annular area within the well/borehole 20, which space is not occupied by at least one vapor line 2, by a liquid line 3, and by insulation 5) to the surrounding geology 19.

After exiting the well 20, the refrigerant 9 next travels through at least one expansion device 23. In the cooling/refrigeration field, expansion devices are typically a TXV, or the like, and/or a pin restrictor orifice type expansion device, which expansion devices come in a variety of designs and are all well understood by those skilled in the art. In the heating mode, an expansion device is typically an automatic expansion device and/or a pin restrictor orifice type expansion device, which are also well understood by those skilled in the art.

Here, only one expansion device 23 is shown as being situated in the liquid refrigerant transport line 3, between the well 20 (the exterior heat exchanger) and the air handler 24 (the interior heat exchanger). Here, the one expansion device 23 is an electronic expansion device 23 that is specially programmed to operate in either the cooling/refrigeration mode, or in the heating mode. In the cooling mode, the expansion device 23 lowers both the temperature and the pressure of the cool liquid phase refrigerant, to enable the cold refrigerant to absorb and remove heat from the air 17 within the area to be cooled/refrigerated. Typically, in the cooling/refrigeration mode, the interior air is blown over at least one finned refrigerant line 18 in an air handler 24 to transfer heat from the interior air 17 into the cold refrigerant. Instead of an air handler 24, as shown herein, a water, or other type, of heat exchanger may be optionally used to transfer the heat, as would be well understood by those skilled in the art.

As the mostly liquid phase refrigerant absorbs heat from the interior air 17, the liquid refrigerant changes phase back into a vapor and travels out of the air handler 24 into an accumulator 14, which prevents liquid phase refrigerant from entering and slugging the compressors, 7 and 8. The refrigerant exits the accumulator 14 and next travels into the compressors, 7 and 8, where the pressure and temperature of the refrigerant 9 is increased, to repeat the cycle. The refrigerant may be R-134A, R-404A, and $CO_2$, or the like.

FIG. 1 shows and describes a DX geothermal refrigeration system design 1 operating in the cooling mode only. However, the same design 1 can be utilized for a DX geothermal at pump cooling mode only system. However, when only operating in the cooling mode as a geothermal DX heat pump system, the refrigerant may be R-410A, R-407C, and $CO_2$ (R-744), or the like.

While FIG. 1 shows and describes a DX geothermal refrigeration system 1, via the addition of a reversing valve (not shown herein as same is well understood by those skilled in the art), via utilizing the electronic expansion valve 23 as heating mode expansion device (instead of a cooling mode expansion device 23), and appropriate electrical controls (which are not shown herein but which are well understood by those skilled in the art), the subject refrigeration system design 1 can easily be converted into a reverse-cycle DX geothermal heat pump system design. When utilized as a reverse-cycle DX geothermal heat pump system, the working fluid refrigerant may be R-410A, R-407C, and $CO_2$ , or the like.

Figure 5:
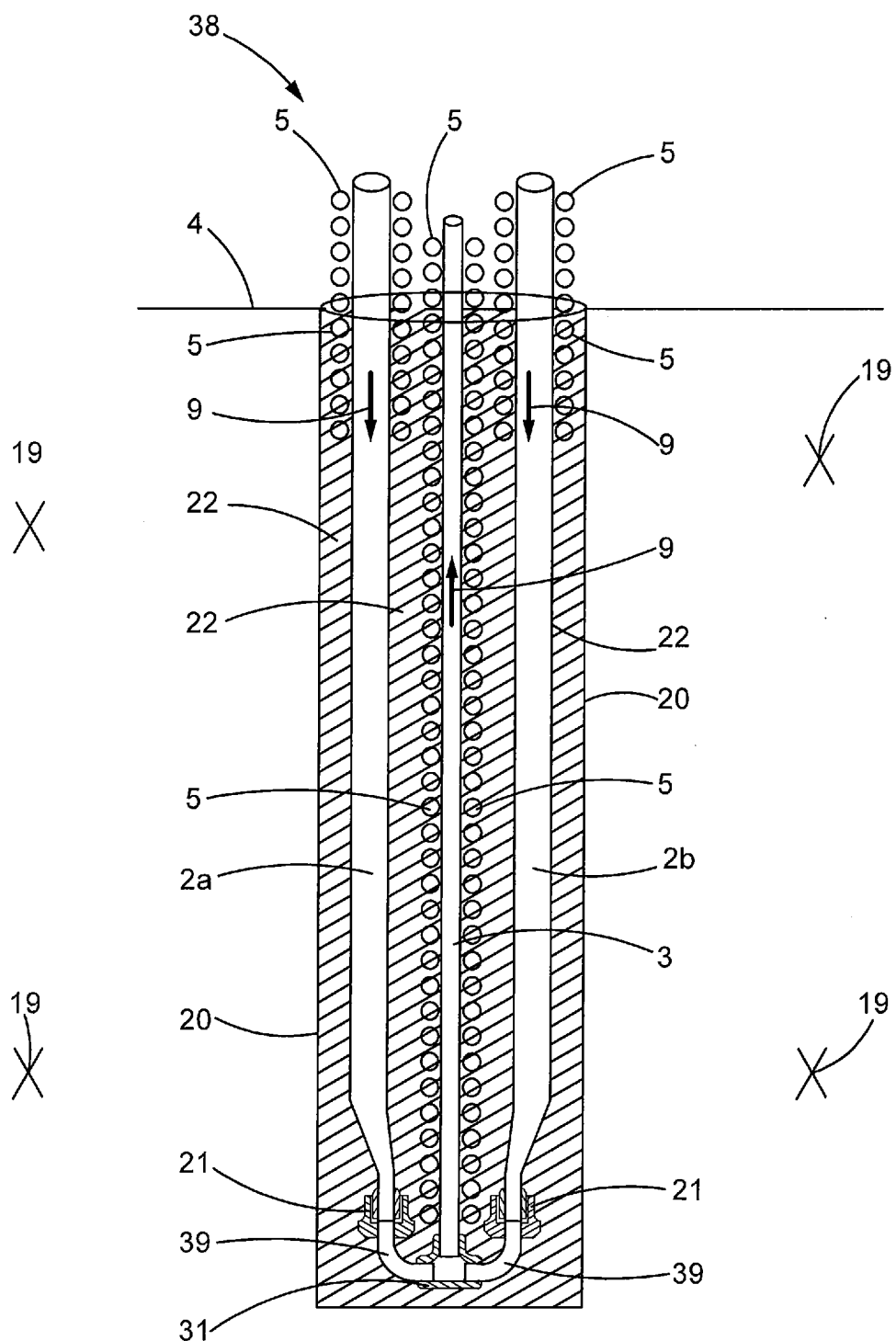
FIG. 5 is a side view, shown as operating in the cooling mode, of a sub-surface DX geothermal ground loop design, for use in at least one of a DX geothermal reverse-cycle heat pump system and a DX geothermal refrigeration system, where the conventional single larger vapor refrigerant transport line is herein comprised of at least two vapor refrigerant transport lines coupled, at/near the bottom of a grouted well, to a centrally located single insulated liquid refrigerant transport line.
Figure 6:
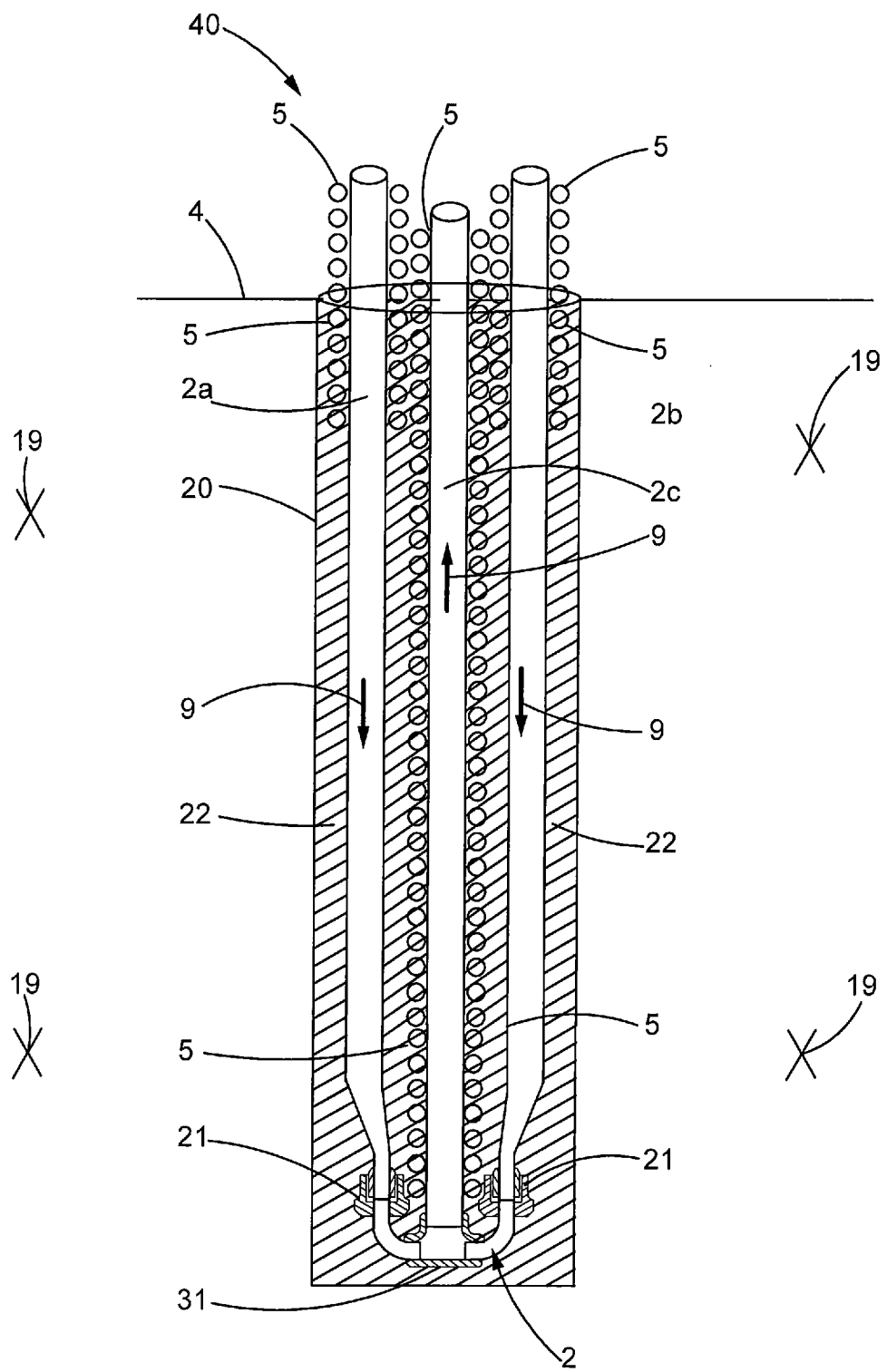
FIG. 6 is a side view of a sub-surface DX geothermal ground loop design, for use in a DX geothermal heating mode only heat pump system, where the conventional single larger vapor refrigerant transport line is herein comprised of at least two such larger vapor lines coupled, at/near the bottom of a grouted well, to a centrally located single insulated vapor refrigerant line.
Figure 7:
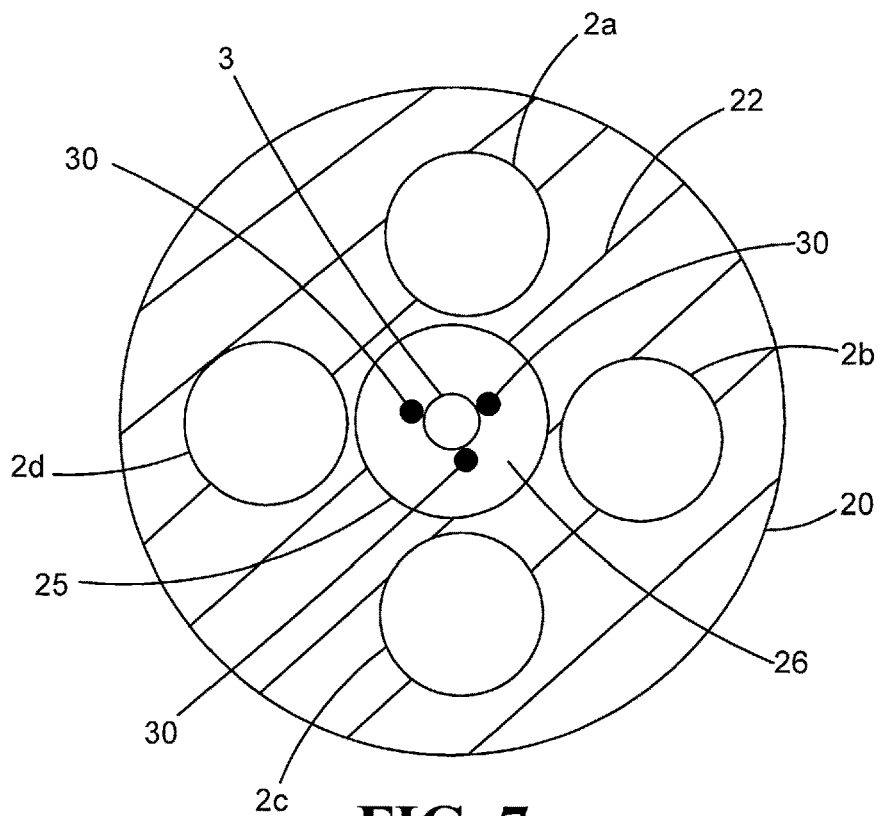
FIG. 7 is a top view of an example of more than only two vapor lines (only two vapor lines are shown above in FIG. 5) utilized for heat transfer in conjunction with one centrally located insulated liquid line, all within a grouted well/casing.
Figure 8:
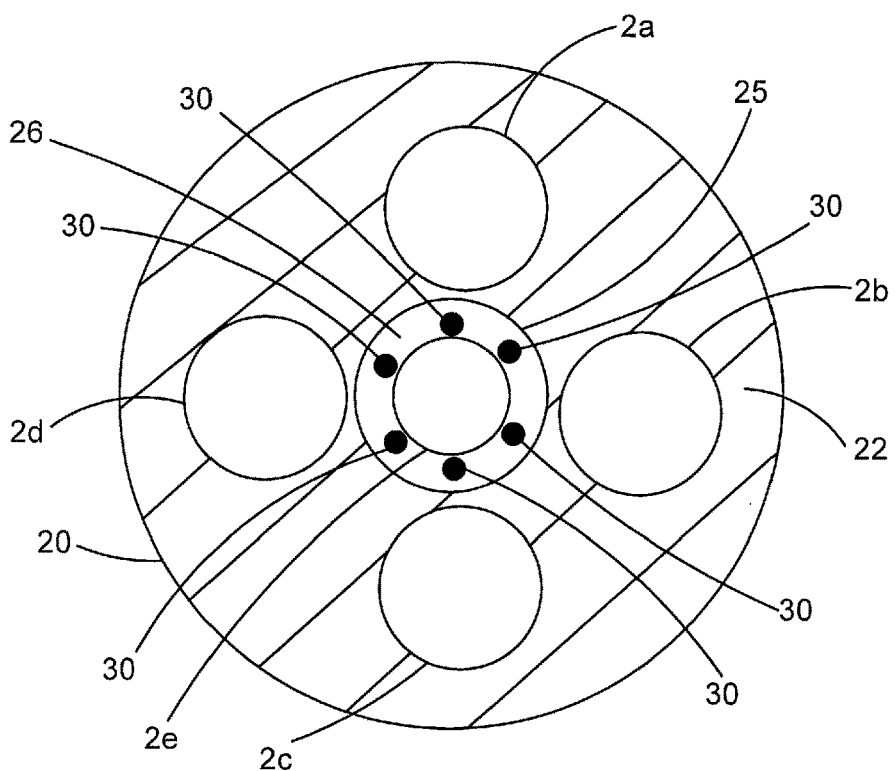
FIG. 8 is a top view of an example of more than only two multi-vapor lines (only two vapor lines are shown above in FIG. 6) utilized for heat transfer in conjunction with one centrally located insulated vapor line, all within a grouted well/casing.

Also, by simply reversing the direction of the refrigerant flow (opposite the direction of arrows 9 shown in FIG. 1) between the air handler 24 and the ground loop, as well as via eliminating the HLHD unit 6, the DX geothermal refrigeration system 1 of FIG. 1 may be converted into a DX geothermal heating only system design. When utilized as a DX geothermal heating only system, the working fluid refrigerant may be one of R-410A, R-407C, and $CO_2$ or the like. Additionally, when utilized as a DX geothermal heating system only, the same electronic expansion device 23 utilized in the cooling may be utilized as a heating mode expansion device to expand the refrigerant and reduce its pressure and temperature before entering the well/casing 20. When utilized as a heating mode only DX system design, the sub-surface refrigerant-to-geology heat exchange loop situated below the surface 4 could optionally be constructed as shown in FIG. 5 or 6, or even with optional additional multiple vapor refrigerant transport lines 2, as shown in FIG. 7 or 8, all as examples, to enhance heat transfer abilities below the surface 4 and/or to reduce excavation and grouting costs, thereby improving overall economic viabilities.

The subject special single electronic expansion device 23 can be programmed to be utilized in one of, or both of, the cooling mode and the heating mode of a reverse-cycle DX geothermal heat pump system, as well as in the refrigeration mode of the system 1 shown herein. The subject special single electronic expansion device 23 may be used in conjunction with any DX geothermal system, such as a ground loop design that has less than 100-120 feet of vapor transport line 2 disposed beneath the surface 4 per ton of maximum heat pump system design capacity (where one ton equals 12,000 BTUs).

In fact, extensive testing has demonstrated that, when a super-efficient vacuum insulation (illustrated as empty annular space 26 in FIGS. 2-4 and 7-8) is utilized in appropriate sub-surface 4 portions (such as the portions disclosed herein as an example) of any DX geothermal heat pump system and of a DX refrigeration system 1, the design depth per ton of system design capacity of one of any DX refrigeration system's 1 and of any conventional DX system's sub-surface heat exchanger/ground loop depth can be reduced by at least about one-third. The term "ground loop" is defined herein as being comprised of at least one un-insulated vapor refrigerant transport return line 2 into the well 20, coupled to at least one of a liquid refrigerant transport line 3 and a vapor refrigerant transport line 2 (as shown in FIGS. 6 and 8 hereinafter) supplying refrigerant up and out of the well 20. Testing has indicated that such a one-third ground loop depth reduction, and corresponding well 20 depth and grouting 22 reduction, enabled by the herein described vacuum insulation cannot knowingly reasonably be achieved absent the use of the herein described vacuum insulation.

The approximately 100-120 foot length of ground loop required for each ton of design capacity in conventional DX systems is well understood by those skilled in the art. However, when such a condensed ground loop design is utilized in conjunction with a vacuum insulation design, the use of the specially programmed electronic expansion valve 23 should also preferably always be utilized.

Extensive testing has shown that when such an electronic expansion valve 23 is utilized in a DX geothermal refrigeration system or a DX geothermal heat pump system, when operating in one of any refrigeration/cooling mode and in any heating mode, the valve 23 should preferably be programmed to maintain certain designated refrigerant superheat levels in the cooling mode, and certain calculated refrigerant temperature levels similar to superheat calculations in the heating mode, as hereinafter more fully explained.

In the heating mode as well as in the cooling mode, it is commonly known by those skilled in the art that compressor, 7 and 8, manufacturers generally recommend refrigerant 9 superheat levels be maintained around 20° F. in the refrigerant. At least one DX system manufacturer, teaching multiple combined vertically oriented and/or slanted wells be utilized per DX system over one ton in size (which respective individual wells generally do not exceed one hundred feet in depth), recommends that superheat in both the heating mode and the cooling mode be maintained around zero. However, with a DX refrigeration system 1 and/or with a DX heat pump system, detailed and extensive testing has shown that refrigerant superheat levels should be maintained within approximately 1-3° F. via the special electronic expansion valve 23 programming when operating in the refrigeration/cooling mode, and the valve 23 should be otherwise specially programmed to maintain certain apparent superheat parameters when operating in the heating mode.

A refrigerant superheat less than zero (a zero superheat level is at a refrigerant saturation level) is impossible to exist in a refrigerant, because when the superheat temperature falls below zero, the refrigerant is condensed into a liquid state. At a saturation temperature/pressure state, a refrigerant can exist in both a liquid and a vapor state, and when the temperature of the refrigerant rises above zero, it changes into a vapor containing superheat (a heat level above the saturation point). However, testing has demonstrated that, via utilization of the DX heat pump system disclosures herein, when operating in the heating mode, it is possible to obtain what initially appears to be a negative superheat level, but in reality is not.

Such an appearance occurs when there is at least one of liquid phase refrigerant and a saturated refrigerant (containing liquid phase refrigerant along with vapor phase refrigerant at the saturation temperature/pressure level) that is subjected to heat at the superheat temperature measuring point before the refrigerant enters the compressor 7 and/or 8. When a liquid phase refrigerant and/or a saturated refrigerant is subjected to only a slight amount of heat above the temperature of the subject refrigerant saturation point, at least some of the liquid phase refrigerant flashes into a vapor phase. For purposes of this disclosure, the refrigerant temperature measuring point for superheat calculations may be taken at the vapor line 2 segment herein identified as the suction line portion 13, situated between the accumulator 14 and the first compressor 7. In this particular vapor line 2 area (i.e., the suction line portion 13), at least some heat is supplied to liquid phase refrigerant via the hot oil return line 15 itself and/or via proximity to the hot/warm oil return line 15, and/or via proximity to the first hot compressor 7. Liquid phase refrigerant can exist in this particular area via saturated refrigerant returning from the well 20 and/or via liquid phase refrigerant being suctioned into the compressor, 7 and/or 8, from the bottom of the accumulator 14 through the oil return orifice in the bottom portion of the U bend within the accumulator 14.

An oil return orifice in the bottom portion of a U bend within an accumulator 14 is well understood by those skilled in the art and is therefore not shown herein in detail. When a saturated refrigerant, containing some liquid phase refrigerant, is subjected to only a slight amount of heat, at least some of the liquid phase refrigerant flashes into a vapor phase. When the condensed liquid phase refrigerant flashes into a vapor phase via the acquisition of heat (from any source), there is an immediate refrigeration/cooling effect caused by the expanding refrigerant gas. This refrigerant/cooling effect lowers the temperature of the refrigerant vapor at a point at and/or near the point of refrigerant phase change and expansion. Thus, when a temperature measurement of the refrigerant is taken at or near the point of such a phase change (such as at the suction line portion 13 as shown and described herein), the temperature that is taken reads lower than the actual temperature of the already vaporized refrigerant being pulled into the compressor, 7 and/or 8, from the accumulator 14 due to the site specific refrigeration effect created by expanding gas/refrigerant. Under such conditions, when one compares the actual temperature of the refrigerant taken at the suction line portion 13, the temperature of the now mostly, or all, vapor phase refrigerant is lower than that indicated on the standard Temperature/Pressure Chart (which Chart is well understood by those skilled in the art) for the subject refrigerant. Such a lower registered vapor phase refrigerant temperature results in what appears to be a negative superheat number for the refrigerant, when compared against the listed temperature for the refrigerant at the pressure being listed on the refrigerant's Temperature/Pressure Chart for the actual compressor's, 7 and/or 8, suction pressure. For purposes of electronic valve 23 control set points and programming as disclosed herein, the resulting lower than suction pressure indicated temperature on the Temperature/Pressure Chart, under such conditions, will herein be referred to as an "apparent negative superheat temperature".

Detailed testing has shown that, for a DX heat pump system, such as that disclosed herein for example, an optimum system performance in the heating mode of operation requires the electronic valve to be programmed to maintain between an approximate −0.5 to −3.5° F. apparent negative superheat temperature level.

Figure 2:
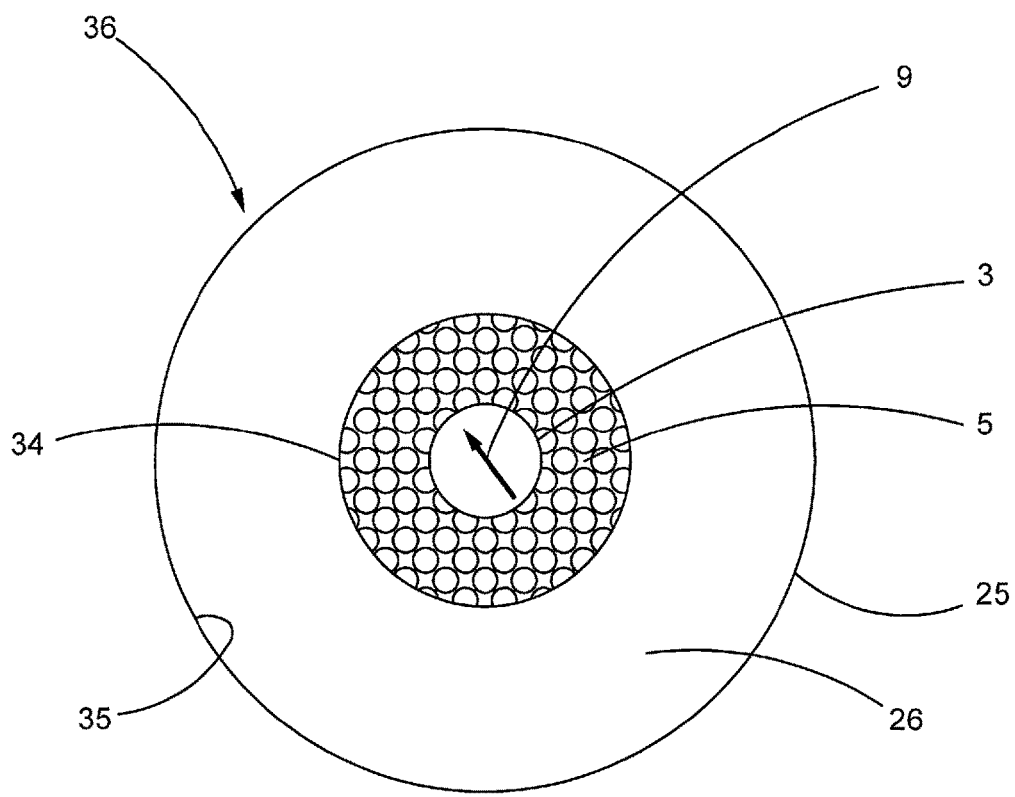
FIG. 2 is a top view of a special super-efficient insulation means, where a special optional solid-state type insulation surrounds a smaller, cooler, working fluid line, and where the specially optionally insulated smaller and cooler refrigerant line is itself surrounded by a secondary containment pipe, with a vacuum being pulled within the empty annular space between the exterior wall of the optional special insulation and the interior wall of the secondary containment pipe.

FIG. 2 is a top view of exemplary insulation, 5 and 26, together herein referred to as an insulation assembly 36 for selected portions of the sub-surface segments of liquid refrigerant line 3 used in one of a direct exchange (DX) geothermal refrigeration system (such as shown in FIG. 1 above), and a geothermal DX heat pump system design. The liquid transport line 3 is shown as being filled with a refrigerant as the working fluid.

When the working fluid lines (numbered as 2 and 3 in FIG. 1 hereinabove) utilized in any sub-surface geology for any geothermal heat pump system, and particularly for DX geothermal refrigeration and heat pump systems, maintaining the minimum coolest possible refrigerant temperature from the sub-surface condensing/cooling source when operating in a cooling mode of operation may advantageously increase overall operational efficiencies.

Also, similarly, for a reverse-cycle DX heat pump system operating in the heating mode, as well as for a heating mode only DX heat pump system, it is advantageous that geothermal heat gained within the larger vapor transport tube (shown as 2 in FIG. 1 above) not be inefficiently lost via conductive heat transfer (via Fourier's Law) to the cooler and smaller liquid phase refrigerant line 3 before reaching the primary design heat exchange area (shown as an air handler 24 in FIG. 1 hereinabove as an example).

To help insure both such objectives are met to the maximum extent possible, the liquid transport line 3 may be surrounded by a super-efficient insulation assembly 36 that includes insulation means 5 and/or 26. Historically, virtually all heating mode only and reverse-cycle DX heat pump systems insulate some portion of the smaller liquid refrigerant line 3 with a solid-state plastic or rubber layer (typically comprised of at least one of solid and expanded and bubbled polyethylene, which has poor heat transfer rates and is, therefore, an acceptable insulation means). The super-efficient insulation assembly 36, however, may be 1-10 times more efficient, than conventional HVAC insulation materials. While the term insulation is sometimes generally used herein (such as in FIG. 1 above), the term in its general sense is herein defined as meaning at least one of regular solid-state insulation 5 and a vacuum insulation means. A vacuum insulation is achieved by evacuating an empty annular space 26, as shown in FIGS. 2-4 and 7-8.

Specifically, testing has demonstrated that the gain of heat (in one of the refrigeration and cooling modes of operation) and the loss of heat (in the heating mode of operation), in un-insulated or poorly insulated liquid refrigerant line 3, creates a loss of otherwise optimal system operational efficiencies. Most of the subject inefficiencies, via the said inefficient (and unwanted) heat transfer that occurs between the un-insulated or poorly insulated liquid refrigerant line 3 and the vapor refrigerant line 2 is the result of conductive heat transfer, as heat naturally flows from a warmer heat source into a proximately located cooler heat transport fluid/refrigerant, circulating within a cooler and smaller liquid refrigerant line 3. Such a proximate location of the warmer vapor line 2 and the cooler liquid line 3 is shown hereinabove in FIG. 1, as an example.

Testing has shown that in order to provide a super-efficient insulation assembly 36, the liquid refrigerant line 3 may be surrounded with a solid-state type of insulation layer 5. The insulation layer 5, in turn, may be surrounded by a secondary containment pipe 25, thereby to define an annular space 26 between the exterior wall 34 of the insulation layer 5 and the interior wall 35 of the secondary containment pipe 25. A vacuum of a suitable level, such as five hundred microns or less, may be applied to the empty annular space 26. With most of the air removed from within the empty annular space 26, the amount of heat conductive material within the space 26 is significantly reduced. Further, the provision of a solid-state insulation material layer 5 protects against conductive heat transfer as well as radiant heat transfer. The insulation layer 5 also provides a buffer against any portion of the liquid refrigerant line 3 that might otherwise touch against the interior side wall 35 of the secondary containment pipe 25. The containment pipe 25 may be comprised of a metal or a poor heat conductive material, such as polyethylene, or the like. The use of a metal containment pipe 25 is acceptable when the liquid transport line 3 is insulated with a solid/foam/plastic, or the like, material to prevent the smaller line's 3 thermal contact with the containment pipe 25. Alternatively, the use of a metal containment pipe 25 is acceptable when a spacing means (such as the nubs 30 in FIG. 4) is utilized. However, even when a solid-state insulation layer 5 is provided, it may be advantageous to construct the containment pipe 25 of a poor heat conductive material, instead of a metal material, as it may lower costs and provide an extra insulation value. Such an insulation assembly 36 is at least approximately 100% more efficient at insulating the liquid refrigerant line 3 than known conventional insulation used in DX heat pump systems.

The solid-state insulation layer 5 may be formed of various types of materials, depending on certain factors such as cost and temperature differential. For example, when temperature differentials between the exterior wall of the liquid line 3 and the temperature on the exterior wall of the secondary containment pipe 25 are less than about 200° F., the solid-state insulation material may be a solid (with or without entrained air bubbles) such as polyethylene (or the like), with optional radiant heat protection not mandatory due to the relatively low temperature differentials. Also, when operating at lower temperature differential levels, the solid-state insulation material may be capable of withstanding temperatures below freezing.

However, for example, when temperature differential between the exterior wall of the liquid line 3 and the exterior wall of the secondary containment pipe 25 exceed about 200° F., the solid-state insulation layer material may be a high temperature resistant, micro-porous, primarily silica (or the like), material with optional radiant heat protection included. The insulation material may be constructed of a high temperature resistant solid material, with optional radiant heat protection. Generally, a high temperature resistant insulation material should be able to withstand temperatures of at least about 220° F. in any geothermal DX heat pump system.

Figure 3:
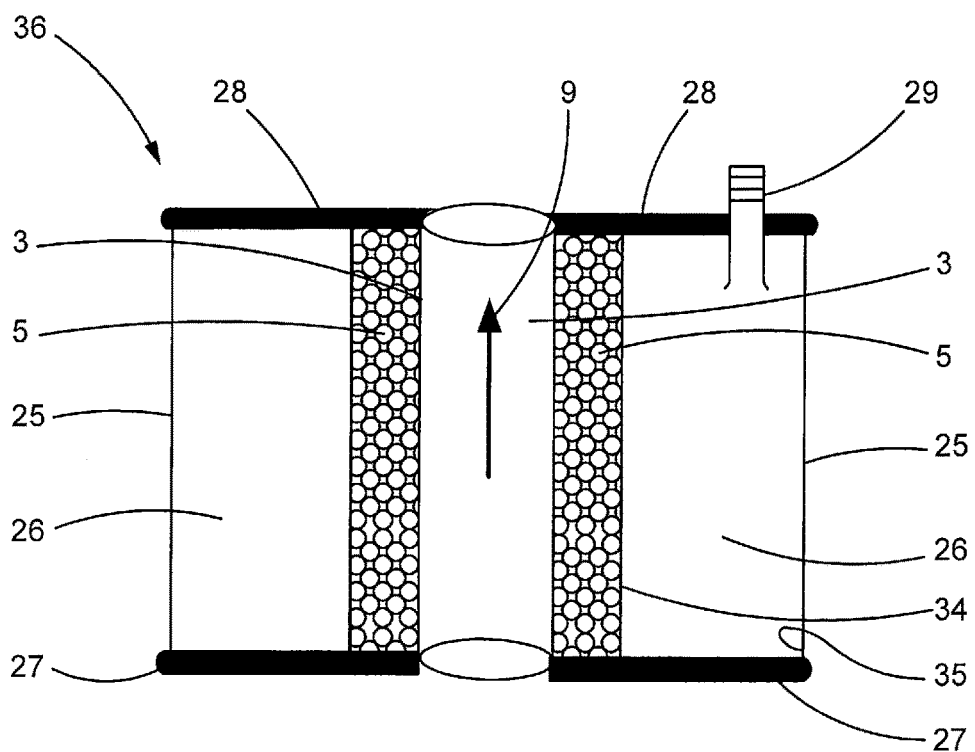
FIG. 3 is a side view of a special super-efficient insulation means, where a special optional solid-state insulation surrounds a smaller, cooler, working fluid line, and where the optional specially insulated smaller and cooler refrigerant line is itself surrounded by a secondary containment pipe, with a vacuum being pulled within the empty annular space between the exterior wall of the optional special insulation and the interior wall of the secondary containment pipe.

FIG. 3 is a side view of the insulation assembly 36. Here, as in FIG. 2 above, the insulation assembly 36 surrounds the liquid line 3. The liquid line 3 is surrounded by a secondary containment pipe 25, with a vacuum being pulled within the empty annular space 26 between the exterior wall 34 of the insulation layer 5 and the interior wall 35 of the secondary containment pipe 25.

In order to facilitate pulling a vacuum within the empty annular space 26, lower and upper seals 27, 28 may be provided on opposite ends of the secondary containment pipe 25. Further, a sealed access port 29 (such as a Schraeder valve or the like) may be provided at (or near) the upper seal 28, to provide access for a vacuum pump.

Figure 4:
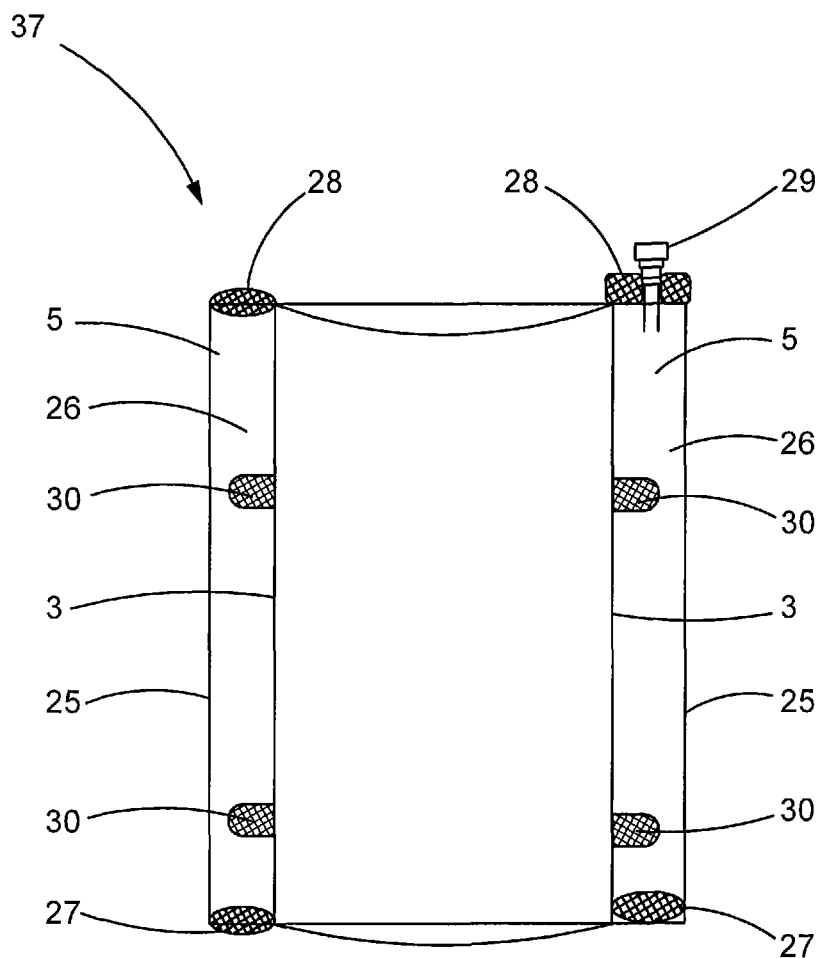
FIG. 4 is a side view of a smaller inner liquid refrigerant transport line, which is insulated by a vacuum pulled within the empty annular space between the exterior wall of the smaller line and the interior wall of a larger surrounding pipe, which larger pipe is preferably comprised of a material with a relatively low heat transfer rate, and which larger pipe is separated from the smaller inner pipe by a spacing means, shown as small nubs herein as an example.

FIG. 4 is a schematic side view of an alternative insulation assembly 37 which omits the solid-state insulation layer 5 discussed above in connection with FIGS. 2 and 3. A vacuum is pulled within the empty annular space 26 between the exterior wall of a liquid refrigerant line 3 and the interior wall of a secondary containment pipe 25. Here, only a segment of the smaller liquid refrigerant line 3 and the secondary containment pipe 25 are shown for illustration purposes of a vacuum being pulled within the empty annular space 26. The vacuum 26 would preferably be pulled to at least approximately 500 microns. The secondary containment pipe 25 of this embodiment may be formed of a poor heat conductive material, such as polyethylene, or the like.

Additionally, the exterior wall of the liquid line 3 has a spacing means 30 to keep the liquid line 3 from contacting the secondary containment pipe 25 over a significant area. Here, the spacing means 30 is shown as small knobs, however the spacing means 30 could optionally be fins, an intermittent solid-state insulation material, or the like. The spacing means 30 may be placed at least approximately sixty degrees apart horizontally around the liquid line 3 to prevent thermal contact with the secondary containment pipe 25. Here, as in FIG. 3 above, the empty annular area 26 has lower and upper seals 27, 28, and a sealed access port 29.

No known conventional DX geothermal heating/cooling systems provide vacuum-insulated working fluid lines, such as those shown herein. The disclosed insulation assembly 37 includes a vacuum space 26 to provide improved insulation for the DX geothermal heating/cooling industry that materially enhances overall system operational efficiencies. The insulation assembly 37 may not only be utilized for the refrigeration DX system design shown as 1 in FIG. 1 hereinabove, but may also be utilized to increase operational efficiencies in at least one of any refrigeration DX system design, and in at least one of any DX geothermal heating/cooling system design.

FIG. 5 is a side view of a sub-surface DX geothermal ground loop 38 for use in a DX geothermal heat pump or refrigeration system, where the conventional larger sized single vapor refrigerant line 2 includes at least two vapor refrigerant transport lines 2a, 2b coupled to a single smaller diameter liquid line 3 that is fully surrounded by an insulation layer 5. Testing has demonstrated that, so long as the heat transfer rate ability (via conductive heat transfer rates) of the sub-surface geology 19 surrounding the well/casing 20 is greater than that of the heat transfer rate of the refrigerant via its mass flow rate, the addition of multiple vapor lines 2a, 2b within a given well 20 can enable one to correspondingly reduce the depth of the well 20 from that of conventional DX geothermal heat pump system designs utilizing only one vapor line 2 and one liquid line 3 (such as shown in FIG. 1 above), but typically only in conjunction with a super-efficient insulated liquid line 3.

In fact, testing has demonstrated that when a conventional single well DX heat pump system design, where only one closed loop, comprised of a single vapor line 2 coupled near the bottom of the well to a single liquid line 3 (as shown in FIG. 1 above) of about 120 feet of total well depth per ton (where one ton equals 12,000 BTUs) of heating/cooling system design capacity, the ground loop depth may be cut to approximately 60 feet per ton of system capacity when two similarly sized vapor lines 2 are coupled 21 to respective un-insulated liquid lines 39 near the bottom of the well 20, which two un-insulated liquid lines 39 are respectively distributed by a distributor 31 into a single primary insulated 5 liquid refrigerant line 3. By reducing the requisite vertically oriented well depth by about fifty percent, associated well drilling and grouting costs are reduced.

While the use of two such vapor lines 2a, 2b are disclosed herein, as long as relevant geothermal geology heat transfer rates (in BTU/Ft. Hr. degree F.) and refrigerant mass flow rates remain appropriate, additional vapor lines 2 may be added in a similar fashion to further proportionately shorten the requisite well depth. FIG. 7 shows a top view of such a design having four vapor lines 2 positioned around a centrally positioned insulated liquid line 3, where a secondary containment pipe 25 surrounds the liquid line 3, with a vacuum being pulled within the empty annular space 26 between the two lines/pipes, 3 and 25.

Additionally, as atmospheric temperatures widely vary and can adversely affect temperatures of the sub-surface geology 19 relatively close to the surface 4, the respective vapor lines 2 are shown as also being insulated for a modest depth below the ground surface 4. Generally, the insulation assembly, comprised of at least one of a solid-state type insulation and a vacuum insulation (respectively shown as 5 and 26 in FIGS. 2, 3, 4, 7 and 8 herein) surrounding the vapor lines 2 should extend only about 1-10 feet below the maximum frost line in any particular geographic location, and/or no more than about 10 feet below the surface closer to the equator where there is no frost line. Above the surface 4, all exterior liquid and vapor lines 3, 2 may be insulated with a solid-state type insulation (such as an expanded plastic/rubber foam), as is commonly done. As in FIG. 1 above, the empty area within the well 20 is shown as being filled with a heat conductive fill material 22, such as a Grout 111, or the like. Also, while an insulation layer 5 is shown generally herein, it should be understood that a vacuum insulation assembly may also be provided.

FIG. 6 is a side view of a sub-surface ground loop 40 for use in a DX geothermal heat pump heating mode only system, where the vapor refrigerant line 2 includes at least two larger sized vapor refrigerant lines 2a, 2b coupled to another centrally located single larger sized vapor refrigerant line 2c. Here, instead of providing a smaller diameter liquid line as disclosed above, a single larger sized vapor refrigerant line 2c is provided for use in a heating mode only application.

In conventional DX geothermal heat pump systems, when operating in the heating mode, the refrigerant travels via only one larger supply vapor refrigerant transport line 2c up and out of the well 20, and the refrigerant travels into the well 20 via only one liquid return refrigerant transport line. As is well understood by those skilled in the art, the refrigerant flow reverses direction within the well 20 when the heat pump system is operating in the cooling mode (i.e., opposite the direction 9 shown in FIG. 1).

However, while in the heating mode of operation, the warmest sub-surface geology 19 is generally at the bottom of the well 20. Thus, for a heating mode only application, particularly in conjunction with a vacuum insulated and centrally located vapor refrigerant supply line 2c transporting heated refrigerant up and out of the well 20, it is advantageous to reverse the customary traditional DX geothermal heat pump system refrigerant flow direction to permit the coolest refrigerant to pick heat up (via conductive heat transfer with the surrounding sub-surface geology 19) as it travels down the well 20, instead of picking up heat as the refrigerant travels up and out of the well 20 (as is conventional), with the maximum geothermal heat gain realized near the bottom of the well 20, as well as providing the warmest possible supply of refrigerant out of the well 20, via a vacuum insulated, centrally located, larger sized vapor refrigerant line 2c.

While an insulation layer 5 is shown generally herein, it should be understood that a vacuum insulation assembly may also be provided around the centrally located refrigerant supply transport line 2c.

Further, the larger size of the refrigerant supply line permits the refrigerant entering the well 20 to more fully expand, thereby resulting in reduced pressure and temperature. As a result, the refrigerant 9 may have an initial greater temperature differential within the well 20 from the surrounding geology 19 and thereby more efficiently acquire more naturally occurring heat at a faster rate.

While two larger sized vapor refrigerant transport lines 2a, 2b are shown herein as returning cooled refrigerant to the well 20, where natural geothermal heat will be repeatedly acquired from the surrounding geology 19 below the surface 4, one may optionally elect to utilize only one, or more than two, such larger vapor refrigerant transport lines 2a or 2b for heat acquisition within the well 20, depending upon subsurface heat transfer rates in the surrounding geology 19 and preferred system design. Here, as two such larger vapor refrigerant transport return lines 2a, 2b are shown, the two respective return lines 2a, 2b are combined into a single larger supply vapor refrigerant supply line 2c via line couplings 21 and a distributor 31 located at/near the bottom of the well 20.

When more than one uninsulated vapor line 2a, 2b is provided within a given well 20 when the system is operating in the heating mode, and when adequate heat transfer rates are available within the geology below the surface 4, well depth and grouting requirements may be reduced.

Additionally, as atmospheric temperatures widely vary and can adversely affect temperatures of the sub-surface geology 19 relatively close to the surface level 4, the respective vapor lines 2a, 2b are shown as also being insulated for a modest depth below the ground surface 4. Generally, the insulation assembly surrounding the vapor lines 2a-c, which may include a solid-state type insulation and a vacuum insulation, may extend only about 1-10 feet below the maximum frost line in any particular geographic location, and/or no more than about 10 feet below the surface closer to the equator where there is no frost line. Above the surface 4, all exterior liquid 3 and vapor 2 refrigerant lines should at least be insulated with a solid-state type insulation (such as an expanded plastic/rubber foam). The empty area within the well 20 may be filled with a heat conductive fill material 22, such as a Grout 111, or the like.

FIG. 7 is a top view of an example of a well 20 containing four larger sized vapor refrigerant transport lines 2a-d positioned around a centrally located, vacuum insulated, smaller diameter, liquid line 3. To provide optimum operational results, a vacuum insulation, comprised of an empty annular space 26 between the liquid line 3 and a secondary containment pipe 25, is required to shorten well depths where multiple vapor refrigerant transport lines 2a-d are provided.

In this embodiment, a containment pipe 25 surrounds the liquid line 3, with a vacuum being pulled within the empty annular space 26 between the exterior wall of the liquid line 3 and the interior wall of the secondary containment pipe 25. The vacuum may be pulled to at least about 500 microns.

As in FIG. 4 above, small nubs 30 are shown as an example of a spacing means 30 to keep the smaller liquid line 3 from thermally contacting the secondary containment pipe 25. As illustrated, no direct insulation layer is provided around the centrally located liquid line 3, and instead only a vacuum insulation 26 is used.

When design characteristics permit, the secondary containment pipe 25 may be constructed of a poor heat conductive material, such as polyethylene, or the like, so that if the centrally located liquid line 3 touches the secondary containment pipe 25, there is minimal conductive heat transfer. Polyethylene is one preferred secondary containment pipe 25 material, as it has a heat transfer rate of about 0.225 BTUs/Ft. Hr. Degrees F.

The otherwise empty annular area within the well 20 is shown as being filled with a heat conductive fill material 22, such as Grout 111 which has a relatively high heat conductivity rate of about 1.4 BTUs/Ft. Hr. Degrees F.

FIG. 8 shows a top view of ground loop with four vapor lines 2a-d positioned around a centrally positioned, insulated vapor refrigerant transport line 2e, where a secondary containment pipe 25 surrounds the centrally located vapor line 2e, with a vacuum being pulled within the empty annular space 26 between the two line 23 and the pipe 25. For optimum value in a design such as that described herein, a vacuum insulation design may be incorporated around the central large supply vapor line 2e transporting warmed refrigerant up and out of the well 20. Such a design may be used in the heating mode only ground loop design 40 as shown above in FIG. 6.

To provide optimum operational results, a vacuum insulation, comprised of an empty annular space 26 between the liquid line 3 and a secondary containment pipe 25, may shorten well 20 depths where multiple vapor refrigerant transport lines 2a-d are utilized in any of the ground loop DX heat pump system designs disclosed herein. The vacuum 26 should be pulled to at least about 500 microns.

As in FIG. 4 above, small nubs 30 are shown as an example of a spacing means 30 to keep the centrally located vapor line 2 from being in any significant proximate thermal contact with the secondary containment pipe 25. However, here, more than three spacing means 30 are shown. The spacing means 30 may be of any design, but should be kept to the minimum design necessary to keep the interior centrally located vapor line 2 separated from any significant thermal contact with the secondary containment pipe 25.

The secondary containment pipe 25 may be constructed of a poor heat conductive material, such as polyethylene, or the like, so that if the centrally located liquid line 3 touches the secondary containment pipe 25, there is minimal conductive heat transfer. Polyethylene is one preferred secondary containment pipe 25 material, as it has a heat transfer rate of about 0.225 BTUs/Ft. Hr. Degrees F.

The otherwise empty annular area within the well/casing 20 is shown as being filled with a heat conductive fill material 22, such as Grout 111 which has a relatively high heat conductivity rate of about 1.4 BTUs/Ft. Hr. Degrees F.

Alternatively, in the embodiment of FIG. 8, as well as the embodiments shown in FIGS. 4 and 7, the spacing means 30 may be eliminated when the secondary containment pipe 25 is comprised of one of polyethylene and a poor heat conductive material.

While only certain embodiments have been set forth, alternatives and modifications will be apparent from the above description to those skilled in the art. These and other alternatives are considered equivalents and within the spirit and scope of this disclosure and the appended claims.

I claim:
1. A geothermal DX heat pump system comprising:
   at least one compressor;
   at least one expansion device;
   at least one of an interior refrigerant to air heat exchanger and an interior refrigerant to water heat exchanger;
   a reversing valve;
   an accumulator;
   a secondary containment pipe made of one of:
      polyethylene, and
      a poor heat conductive material with a thermal conductivity equal to, or less than, the thermal conductivity of polyethylene;

at least one sub-surface geothermal heat exchanger, each of the at least one sub-surface geothermal heat exchanger is disposed within a well, and the at least one sub-surface geothermal heat exchanger comprises:
at least two un-insulated lines;
a single liquid line made of metal;
wherein the at least two un-insulated lines are coupled to the single liquid line at the bottom end of the at least one sub-surface geothermal heat exchanger;
wherein the secondary containment pipe surrounds the single liquid line, and the at least two un-insulated lines are located outside of and spaced apart from the secondary containment pipe;
wherein at least a 500 micron vacuum is pulled between the interior surface of the secondary containment pipe and the exterior surface of the single liquid line; and
wherein the geothermal DX heat pump system is configured to alternately operate in a cooling mode and a heating mode.

2. The geothermal DX heat pump system of claim 1, further comprising:
an additive disposed in the sub-surface geothermal heat exchanger, wherein the additive is configured to prevent compressor lubrication oil from adhering to an interior surface of the at least two un-insulated lines and the single liquid line.

3. The geothermal DX heat pump system of claim 1, further comprising:
a high level heat dissipating unit comprising an inlet pipe and an outlet pipe; and
wherein the diameter of the inlet pipe is the same as the diameter of the at least two un-insulated lines;
wherein the diameter of the outlet pipe is the same as the diameter of the at least two un-insulated lines.

4. The geothermal DX heat pump system of claim 1, wherein the at least one expansion device is an electronic expansion valve programmed to maintain:
between −0.5 to −3.5 degrees F. superheat temperature level in the heating mode; and
between 1 to 3 degrees F. superheat temperature level in the cooling mode.

5. The geothermal DX heat pump system of claim 1, wherein the depth of the well for each respective sub-surface geothermal heat exchanger is inversely proportional to the number of un-insulated vapor lines of said at least two un-insulated vapor lines.

6. A geothermal DX heat pump system comprising:
at least one compressor;
at least one of an interior refrigerant to air heat exchanger and an interior refrigerant to water heat exchanger;
a reversing valve;
an accumulator;
a secondary containment pipe made of one of:
polyethylene, and
a poor heat conductive material with a thermal conductivity equal to, or less than, the thermal conductivity of polyethylene;
at least one sub-surface geothermal heat exchanger, each of the at least one sub-surface geothermal heat exchanger is disposed within a well, and the at least one sub-surface geothermal heat exchanger comprises:
at least two un-insulated lines;
a single liquid line made of metal;
wherein the at least two un-insulated lines are coupled to the single liquid line at the bottom end of the at least one sub-surface geothermal heat exchanger;
wherein the diameter of each of the un-insulated lines is larger than the diameter of the single liquid line;
wherein the secondary containment pipe surrounds the single liquid line, and the at least two un-insulated lines are located outside of and spaced apart from the secondary containment pipe;
wherein the depth of the well for each respective sub-surface geothermal heat exchanger is inversely proportional to the number of un-insulated vapor lines of said at least two un-insulated vapor lines;
at least one electronic expansion valve programmed to maintain:
between −0.5 to −3.5 degrees F. superheat temperature level in the heating mode; and
between 1 to 3 degrees F. superheat temperature level in the cooling mode;
a high level heat dissipating unit comprising an inlet pipe and an outlet pipe, the diameter of the inlet pipe is the same as the diameter of the at least two un-insulated lines, and the diameter of the outlet pipe is the same as the diameter of the at least two un-insulated lines;
wherein at least a 500 micron vacuum is pulled between the interior surface of the secondary containment pipe and the exterior surface of the single liquid line;
an additive disposed in the sub-surface geothermal heat exchanger, wherein the additive is configured to prevent compressor lubrication oil from adhering to an interior surface of the at least two un-insulated lines and the single liquid line; and
wherein the geothermal DX heat pump system is configured to alternately operate in a cooling mode and a heating mode.

7. A geothermal DX heat pump system comprising:
at least one compressor;
at least one expansion device;
at least one of an interior refrigerant to air heat exchanger and an interior refrigerant to water heat exchanger;
a reversing valve;
an accumulator;
a secondary containment pipe made of one of:
polyethylene, and
a poor heat conductive material with a thermal conductivity equal to, or less than, the thermal conductivity of polyethylene;
at least one sub-surface geothermal heat exchanger, each of the at least one sub-surface geothermal heat exchanger is disposed within a well, and the at least one sub-surface geothermal heat exchanger comprises:
at least two un-insulated lines;
a single liquid line made of metal;
wherein the at least two un-insulated lines are coupled to the single liquid line at the bottom end of the at least one sub-surface geothermal heat exchanger;
wherein the diameter of each of the un-insulated lines is larger than the diameter of the single liquid line;
wherein the secondary containment pipe surrounds the single liquid line, and the at least two un-insulated lines are located outside of and spaced apart from the secondary containment pipe;
wherein at least a 500 micron vacuum is pulled between the interior surface of the secondary containment pipe and the exterior surface of the single liquid line; and
wherein the geothermal DX heat pump system is configured to alternately operate in a cooling mode and a heating mode.

* * * * *